(12) United States Patent
Parker

(10) Patent No.: US 10,890,661 B2
(45) Date of Patent: Jan. 12, 2021

(54) SCATTERING AND REFLECTION IDENTIFICATION SYSTEM AND METHOD

(71) Applicant: University of Rochester, Rochester, NY (US)

(72) Inventor: Kevin J. Parker, Rochester, NY (US)

(73) Assignee: UNIVERSITY OF ROCHESTER, Rochester, NY (US)

( * ) Notice: Subject to any disclaimer, the term of this patent is extended or adjusted under 35 U.S.C. 154(b) by 830 days.

(21) Appl. No.: 15/364,581

(22) Filed: Nov. 30, 2016

(65) Prior Publication Data

US 2017/0168149 A1 Jun. 15, 2017

Related U.S. Application Data

(60) Provisional application No. 62/265,185, filed on Dec. 9, 2015.

(51) Int. Cl.
*G01S 7/52* (2006.01)
*G01S 15/89* (2006.01)

(52) U.S. Cl.
CPC ...... *G01S 15/8977* (2013.01); *G01S 7/52071* (2013.01)

(58) Field of Classification Search
CPC .......................... G01S 12/8977; G01S 7/52071
See application file for complete search history.

(56) References Cited

U.S. PATENT DOCUMENTS 5,255,683 A * 10/1993 Monaghan ............... A61B 8/06
600/458

OTHER PUBLICATIONS

Campbell J C and Waag R C 1983 Normalization of ultrasonic scattering measurements to obtain average differential scattering cross sections for tissues J Acoust Soc Am 74 393-9.
Lerner R M and Waag R C 1988 Wave space interpretation of scattered ultrasound Ultrasound Med Biol 14 97-102.
Waag R C 1984 A review of tissue characterization from ultrasonic scattering IEEE Trans Biomed Eng 31 884-93.
Waag R C, Lee P P K, Persson H W, Schenk E A and Gramiak R 1982 Frequency dependent angle scattering of ultrasound by liver J Acoust Soc Am 72 343-52.
Jensen J A 1996 Field: a program for simulating ultrasound systems. In: 10th Nordibaltic Conference on 9 Biomedical Imaging, pp. 351-3553.

* cited by examiner

*Primary Examiner* — Krystine E Breier
(74) *Attorney, Agent, or Firm* — Riverside Law LLP

(57) ABSTRACT

A method of forming an image of a region of interest using a pulse-echo imaging device is described. The method includes the steps of transmitting a pulse, discriminating an echo of the pulse by comparison to a plurality of Hermite polynomials, and determining a color for display based on the comparison. A system for forming an image of a region of interest is also described. The system includes a pulse-echo imaging device for transmitting a pulse and a control unit in communication with the pulse-echo imaging device. The control unit is configured to discriminate an echo of the pulse by comparison to a plurality of Hermite polynomials and determine a color for display based on the comparison.

3 Claims, 5 Drawing Sheets

SCATTERING AND REFLECTION IDENTIFICATION SYSTEM AND METHOD

CROSS-REFERENCE TO RELATED APPLICATIONS

This application claims priority to U.S. provisional application No. 62/265,185 filed on Dec. 9, 2015 incorporated herein by reference in its entirety.

BACKGROUND

Generally, pulse-echo systems such as sonar, radar, ultrasound and other types of imaging systems generate a pulse, causing the pulse to be incident on a region of interest. The pulse then generates a reflected echo off of the region of interest, and the reflected echo is received back at the pulse-echo device. While pulse-echo systems conventionally generate greyscale images, there are other characteristics that could be obtained. However to obtain additional characteristics, improved systems and methods for properly discriminating an echo of the pulse are required.

Thus, what is needed in the art is a scattering and reflection identification system and method for identifying and discriminating echoes of a pulse.

Throughout the present disclosure, reference will be made to the following references, which are hereby incorporated by reference in their entireties:

Abramowitz M and Stegun I A 1964 United States. National Bureau of Standards. Applied mathematics series, (Washington: U.S. Govt. Print. Off.) pp 780-1.
Bracewell R N 1986 McGraw-Hill series in electrical engineering. Circuits and systems, (New York: McGraw-Hill) p 117.
Campbell J C and Waag R C 1983 Normalization of ultrasonic scattering measurements to obtain average differential scattering cross sections for tissues J Acoust Soc Am 74 393-9.
Cobbold R S C 2007 Biomedical engineering series, (New York: Oxford University Press) p 305.
Jensen J A 1996 Field: a program for simulating ultrasound systems. In: $10^{th}$ Nordibaltic Conference on Biomedical Imaging, pp 351-355.
Lathi B P 1983 HRW series in electrical and computer engineering, (New York: Holt Rinehart and Winston) p 500.
Lerner R M and Waag R C 1988 Wave space interpretation of scattered ultrasound Ultrasound Med Biol 14 97-102.
Macovski A 1983 Medical Imaging Systems, (Englewood Cliffs, N.J.: Prentice-Hall) pp 173-203.
Morse P M and Ingard K U 1987 (Princeton, N.J.: Princeton University Press) pp 400-66.
Poularikas A D 2010 The electrical engineering handbook series, (Boca Raton: CRC Press) p 7.21.
Waag R C 1984 A review of tissue characterization from ultrasonic scattering IEEE Trans Biomed Eng 31 884-93.
Waag R C, Lee P P K, Persson H W, Schenk E A and Gramiak R 1982 Frequency-dependent angle scattering of ultrasound by liver J Acoust Soc Am 72 343-52.
Proakis J G 2001 Digital communications, Fourth edition, (New York: Irwin/McGraw-Hill) chapter 4.

SUMMARY

In one embodiment, a method of forming an image of a region of interest using a pulse-echo imaging device includes the steps of generating a pulse using the pulse-echo imaging device, causing the pulse to be incident on the region of interest to generate a reflected echo, receiving the reflected echo in the pulse-echo imaging device, comparing the reflected echo to at least one Hermite polynomial, wherein each Hermite polynomial is associated with a color, selecting a color for display based on the comparison, and generating an image incorporating the selected color. In one embodiment, a plurality of the Hermite polynomials are defined by the formula $$H_n(t) = (-1)^n e^{t^2} \frac{d^n}{dt^n} e^{-t^2}$$

$$n = 0, 1, 2 \ldots ; t \in \pm\infty.$$

In one embodiment, weighted Hermite polynomials are represented by

| n | Hermite polynomial $H_nG$ | Energy E |
|---|---|---|
| 0 | (1)G | $\sqrt{\pi/2}$ |
| 1 | (2 t)G | $\sqrt{\pi/2}$ |
| 2 | (4 $t^2$ − 2)G | $3\sqrt{\pi/2}$ |
| 3 | (8 $t^3$ − 12 t)G | $15\sqrt{\pi/2}$ |
| 4 | (16 $t^4$ − 48 $t^2$ + 12)G | $105\sqrt{\pi/2}$ |
| 5 | (32 $t^5$ − 160 $t^3$ + 120 t)G | $945\sqrt{\pi/2}$ |
| n | $H_nG = (-1)^n[2\ tH_{n-1}(t) - 2(n-1)H_{n-2}(t)]$ | |

Notation:
$G = \exp(-t^2)$. Energy $= \int_{-\infty}^{\infty} G^2 H_n^2 dt = 1 \times 3 \times 5 \times \ldots \times |2n - 1| \times \sqrt{\pi/2}$.

In one embodiment, the step of selecting a color for display includes a comparison to a plurality of values based on convolution of the received echoes with $GH_4(t)$, $GH_5(t)$ and $GH_6(t)$. In one embodiment, the step of selecting a color for display further includes determining a red (R), green (G) and blue (B) value for generating an RGB color. In one embodiment, an envelope is applied to the received echo to determine a value for G, a convolution with $GH_4(t)$ is applied to determine a value for R, and a convolution with $GH_6(t)$ is applied to determine a value for B. In one embodiment, a convolution with $GH_2(t)$ is applied to determine a value for R, an envelope is applied is applied to determine a value for G, and a convolution with $GH_8(t)$ and an envelope are applied to determine a value for B. In one embodiment, $GH_2(t)$ and $GH_8(t)$ are each normalized by $\sqrt{E_n}$. In one embodiment, ratios of $H_2/H_8$ convolution outputs are used for weights in determining R and B values. In one embodiment, the Hermite polynomial is approximated by the pulse-echo such that its normalized cross-correlation in the time domain or spectral magnitudes exceeds approximately 0.85.

In one embodiment, a system for forming an image of a region of interest includes a pulse-echo imaging device configured to generate a pulse and received a reflected echo of the pulse, and a control unit in communication with the pulse-echo imaging device, where the control unit is configured to compare the reflected echo to at least one Hermite polynomial associated with a color, select a color for display based on the comparison, and generate an image incorporating the selected color. In one embodiment, a display unit is connected to the control unit. In one embodiment, a plurality of the Hermite polynomials are defined by the formula $$H_n(t) = (-1)^n e^{t^2} \frac{d^n}{dt^n} e^{-t^2}$$

$$n = 0, 1, 2 \ldots ; t \in \pm\infty.$$

In one embodiment, weighted Hermite polynomials are represented by

| n | Hermite polynomial $H_n G$ | Energy E |
|---|---|---|
| 0 | $(1)G$ | $\sqrt{\pi/2}$ |
| 1 | $(2\,t)G$ | $\sqrt{\pi/2}$ |
| 2 | $(4\,t^2 - 2)G$ | $3\sqrt{\pi/2}$ |
| 3 | $(8\,t^3 - 12\,t)G$ | $15\sqrt{\pi/2}$ |
| 4 | $(16\,t^4 - 48\,t^2 + 12)G$ | $105\sqrt{\pi/2}$ |
| 5 | $(32\,t^5 - 160\,t^3 + 120\,t)G$ | $945\sqrt{\pi/2}$ |
| n | $H_n G = (-1)^n [2\,t H_{n-1}(t) - 2(n-1) H_{n-2}(t)]$ | |

Notation:
$G = \exp(-t^2)$. Energy $= \int_{-\infty}^{\infty} G^2 H_n^2 dt = 1 \times 3 \times 5 \times \ldots \times |2n - 1| \times \sqrt{\pi/2}$.

In one embodiment, the control unit is configured to select a color for display by mapping the received echoes to a plurality of values based on comparison of the echoes with $GH_4(t)$, $GH_5(t)$ and $GH_6(t)$. In one embodiment, the control unit is configured to select a color for display by determining a red (R), green (G) and blue (B) value for generating an RGB color. In one embodiment, the control unit is configured to apply an envelope to determine a value for G, $GH_4(t)$ to determine a value for R, and $GH_6(t)$ to determine a value for B. In one embodiment, the control unit is configured to apply $GH_2(t)$ and an envelope to determine a value for R, an envelope to determine a value for G, and $GH_8(t)$ and an envelope to determine a value for B. In one embodiment, $GH_2(t)$ and $GH_8(t)$ are each normalized by $\sqrt{E_n}$. In one embodiment, the control unit is configured to use ratios of $H_2/H_8$ convolution outputs as weights in determining R and B values. In one embodiment, the Hermite polynomial is approximated by the pulse-echo such that its normalized cross-correlation in the time domain or spectral magnitudes exceeds approximately 0.85. In one embodiment, the method includes the step of generating and reporting at least one statistic about the region of interest based on the comparison. In one embodiment, the at least one statistic is generated by calculating at least one of a mean and standard deviation of output channels, and measures of first and second order statistics.

In one embodiment, a method of forming an image of a region of interest using a pulse-echo imaging device includes the steps of generating a pulse using the pulse-echo imaging device, causing the pulse to be incident on the region of interest to generate a reflected echo, receiving the reflected echo in the pulse-echo imaging device, comparing the reflected echo to the transmitted pulse, the time derivative of the pulse, and the second derivative of the pulse, where each is associated with a unique label, selecting a label based on the comparison, and generating an image incorporating the selected label. A number of digital filters and wavelets are known by those of ordinary skill in the arts to have approximate first derivative and second derivative behaviors and can be employed for this purpose.

BRIEF DESCRIPTION OF THE DRAWINGS

The foregoing purposes and features, as well as other purposes and features, will become apparent with reference to the description and accompanying figures below, which are included to provide an understanding of embodiments and constitute a part of the specification, in which like numerals represent like elements, and in which:

FIG. 5A shows a conventional B-scan image using standard 50 dB dynamic range on the echo envelope. FIGS. 5B-5D show different weights applied to the $H_2$ and $H_8$ outputs, assigned to red and blue channels respectively.

DETAILED DESCRIPTION

Figure 1:
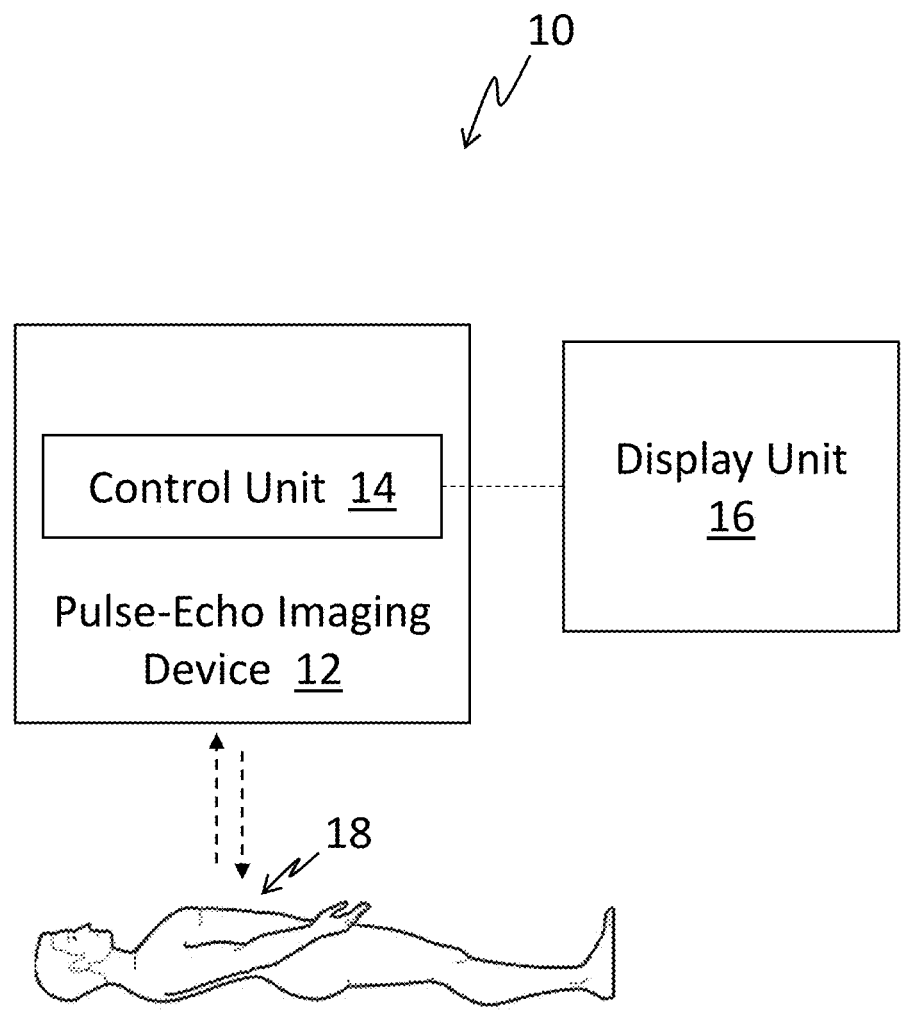
FIG. 1 is a system diagram of a scattering and reflection identification system according to one embodiment.

It is to be understood that the figures and descriptions have been simplified to illustrate elements that are relevant for a more clear comprehension, while eliminating, for the purpose of clarity, many other elements found in systems and methods of scattering and reflection identification. Those of ordinary skill in the art may recognize that other elements and/or steps are desirable and/or required in implementing the systems and methods described herein. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which embodiments belongs. Although any methods and materials similar or equivalent to those described herein can be used in the practice or testing of the embodiments, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects can be presented in a range format. It should be understood that the description in range format is merely for convenience and brevity and should not be construed as an inflexible limitation on the scope. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a scattering and reflection identification system and method.

Under a number of reasonable assumptions, it is possible to model the pulse-echo A-line formation as a convolution of an incident pulse with a sequence of reflections (Cobbold, 2007; Macovski, 1983). The integration can be reduced to a convolution model (Macovski, 1983) such that the received echo e(t) is approximated by $$e(t) = A\left\{p(t)s(x,y) *** R\left(x, y, \frac{ct}{2}\right)\right\} \quad (1)$$

where A is an amplitude constant, p(t) is the propagating pulse in the axial direction, s(x,y) is the beam width in the transverse and elevational axes (and thus the beam pattern is assumed to be a separable function, and R(x,y,z) is the 3D pattern of reflectors or scatterers. The speed of the sound is C, and with a round trip for the echo the axial distance z is replaced by ct/2 in the 3D convolution represented by the symbol ***.

In one dimensional derivations with an assumption of small spatial variations in the acoustic impedance Z=μ/c, the function R can be shown to be related to the spatial derivative of Z in the direction z of propagation of the imaging pulse:

$$R(z) \approx \left(\frac{1}{2}Z_0\right)\frac{\partial Z(z)}{\partial z} \quad (2)$$

This relationship implies that specific structures yield characteristic reflections. A small incremental step function in acoustic impedance, along the direction of the propagating pulse, yields an impulse function for R. The returning echo is then simply a low amplitude replica of p(t,z). However, a thin layer of material with increased impedance yields a positive impulse at the front surface and a negative impulse at the back surface. In the limit this approaches the doublet function, which is the approximation of a derivative. In this case, the echo is a low amplitude approximation to the derivative of p(t,z) with respect to time. This implies a frequency content weighted by ω since a property of Fourier Transforms is (Bracewell, 1986)

$$\Im\left\{\frac{\partial p}{\partial t}\right\} \to j\omega P(\omega) \quad (3)$$

where $\Im\{\ \}$ is the Fourier transform and P(ω) is the is the Fourier transform of p(t).

Finally, in more general scattering theory, the Born approximation for a small (subwavelength) spherical scatterer has a leading term for scattered pressure that is proportional to $\omega^2$ (Morse and Ingard, 1987). Furthermore, a cloud of small, weak scatterers, incoherently spaced, similarly has a scattered pressure dependence with a leading term proportional to $\omega^2$ (Morse and Ingard, 1987). Larger scatterers and random collections of scatterers with longer autocorrelation functions will have more complicated scattering vs. frequency formulas (Lerner and Waag, 1988; Waag et al., 1982; Campbell and Waag, 1983; Waag, 1984).

However, the $\omega^2$ frequency weighting is an important analytical endpoint because by Fourier Transform theorems, an $\omega^2$ weighting corresponds to the second derivative of a function:

$$\Im\left\{\frac{\partial^2 p}{\partial t^2}\right\} \to \omega^2 P(\omega) \quad (4)$$

To summarize, within some degree of approximation, the echo or reflection from an incremental step function of impedance produces an echo proportional to p(t). A thin layer of incrementally higher impedance produces an echo proportional to ∂p/∂t. A cloud of small weak scatterers produces an echo proportional to $\partial^2/\partial t^2$. Methods and systems for identifying echoes by their relationship to the transmitted pulse and its derivatives are described below.

A system 10 for scattering and reflection identification is shown in FIG. 1 according to one embodiment. The pulse-echo imaging device 12 is controlled by a control unit 14 that includes one or more memory and processor units. The pulse-echo imaging device 12 is configured to transmit a pulse and receive an echo that is reflected off of a region of interest 18, such as an organ within a human or animal body. The control unit 14 processes the received echo and sends an output to the display unit 16 for displaying an image.

To identify echoes by their relationship to the transmitted pulse and its derivatives, a family of functions related to the Hermite polynomials is utilized.

The successive differentiation of the Gaussian pulse exp (-$t^2$) generates the nth order Hermite polynomial (see Table 1) (Poularikas, 2010). The Hermite polynomials are defined by the formula $$H_n(t) = (-1)^n e^{t^2} \frac{d^n}{dt^n} e^{-t^2} \quad (5)$$

$$n = 0, 1, 2 \ldots ; t \in \pm\infty$$

TABLE 1

Weighted Hermite polynomials

| n | Hermite polynomial | Energy |
|---|---|---|
|  | $H_n G$ | E |
| 0 | (1)G | $\sqrt{\pi/2}$ |
| 1 | (2 t)G | $\sqrt{\pi/2}$ |
| 2 | (4 $t^2$ − 2)G | $3\sqrt{\pi/2}$ |
| 3 | (8 $t^3$ − 12 t)G | $15\sqrt{\pi/2}$ |
| 4 | (16 $t^4$ − 48 $t^2$ + 12)G | $105\sqrt{\pi/2}$ |
| 5 | (32 $t^5$ − 160 $t^3$ + 120 t)G | $945\sqrt{\pi/2}$ |
| n | $H_n G = (-1)^n[2\ tH_{n-1}(t) - 2(n-1)H_{n-2}(t)]$ | |

Notation:
G = exp(−$t^2$). Energy = $\int_{-\infty}^{\infty} G^2 H_n^2 dt = 1 \times 3 \times 5 \times \ldots \times |2n − 1| \times \sqrt{\pi/2}$.

The peak amplitude of the $H_n G$ functions increase with n. So does the Energy, related to the square of the signal integrated over time. In order to make a fair comparison between $H_n G$ functions, we shall normalize them to constant energy. Note that these Hermite polynomials do no possess orthogonality properties unlike the longer duration Hermite functions (Poularikas, 2010; Abramowitz and Stegun, 1964).

Nonetheless, the $H_4(t)$ function resembles a typical broadband pulse. If a transducer element has a one-way transfer function of $$h(t) = e^{-t^2/(1/2)}[1 + H_2(t)] = e^{-t^2/(1/2)}[4t^2 - 1], \quad (6)$$

then it can be easily shown that the two-way (transmit-receive) impulse response is:

$$h(t) \otimes h(t) = \left(\frac{\sqrt{2}}{64}\right) e^{\frac{-t^2}{T}} H_4(t) \qquad (7)$$

Assuming a pulse-echo system has a round trip impulse response of approximately $A_0 H_4(t) G$, then from the logic of eqn (2)-(4) a reflection from a step function of acoustic impedance will be produced by a delta function $R(z)$ and a corresponding received echo proportional to $GH_4(t)$. However, a thin layer of higher impedance would have a discrete doublet (derivative) in impedance and an echo proportional to $GH_5(t)$ by the derivative nature of the Hermite polynomials. Finally, a small scatterer or incoherent cloud of small scatterers would exhibit a second derivative behavior and return an echo proportional to $GH_6(t)$.

In this framework, the identification task is simply to classify echoes by similarity to either $GH_4(t)$, or $GH_5(t)$, or $GH_6(t)$. A natural classification test employing the concept of matched filters (Lathi, 1983) in parallel would suggest a convolution of the received signal with scaled versions of $GH_4(t)$, or $GH_5(t)$, $GH_6(t)$ to form three post-processed signals. In one embodiment, the convolution of the received signal is used to compare the received signal to G. One could simply select the maximum value at each point in time or display the relative strength as colors.

Figure 2:
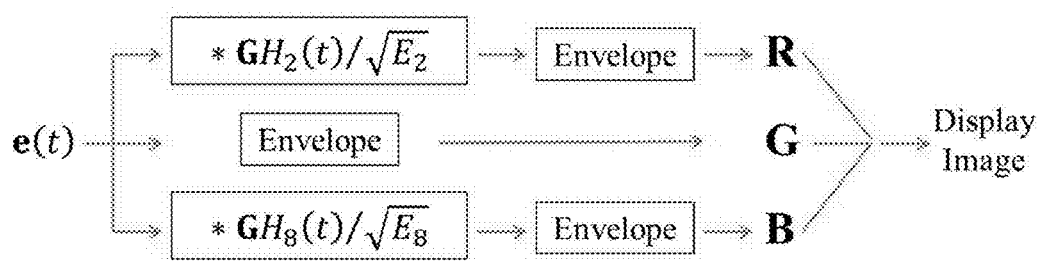
FIG. 2 is a flow chart of a method for determining RGB values according to one embodiment, where the * represents convolution.

The disadvantages of this are twofold. First, each convolution results in some loss of resolution, and secondly, the cross-correlation terms between $GH_4(t)$ and $GH_5(t)$, and similarly for $GH_6(t)$ and $GH_5(t)$ are substantial due to the large overlap of spectra. Other optimal receivers are outlined in Proakis (2001). However, a simpler approach uses the classic envelope as intensity (or "G" in RGB) with some filters applied to gage the relative strength of the echoes with respect to $GH_4(t)$ and $GH_6(t)$. In fact, discrimination can be improved by using more emphasis on the extremes of the spectra, for example $GH_2(t)$ and $GH_8(t)$, each normalized by $\sqrt{E_n}$. A simplified flow chart is shown in FIG. 2.

Alternatively, in certain embodiments, the ratios of the $H_2/H_8$ convolution, and $H_8/H_2$ outputs can be taken and used as weights for the "R" and "B" channels, respectively. The lower frequency ($H_2$) was chosen for R and the higher frequency ($H_8$) for B in accordance with the conventions of optical scattering.

Figure 3:
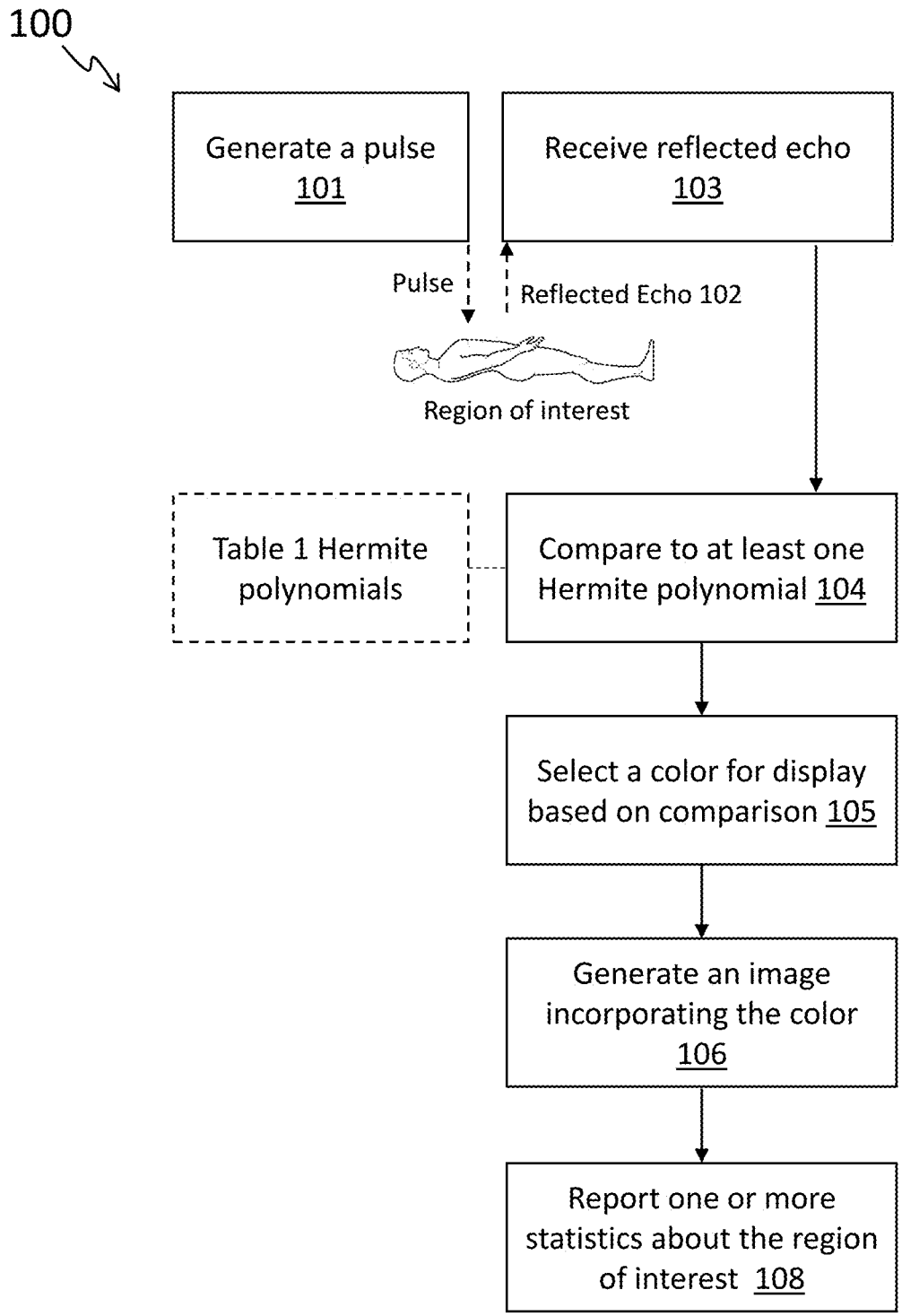
FIG. 3 is a flow chart of a method for forming an image of a region of interest using a pulse-echo imaging device according to one embodiment.

A method 100 of forming an image of a region of interest using a pulse-echo imaging device is described in FIG. 3, according to one embodiment. A pulse is generated using the pulse-echo imaging device 101. The pulse is incident on the region of interest, and it generate a reflected echo off of the region of interest 102. The reflected echo is received in the pulse-echo imaging device 103, and the reflected echo is compared to at least one Hermite polynomial 104. In one embodiment, the Hermite polynomials are represented by the Hermite polynomials in Table 1 above. Each Hermite polynomial is associated with a color. A color for display is selected based on the comparison 105, and an image is generated incorporating the selected color 106. In one embodiment, a comparison to a plurality of values based on $GH_4(t)$, $GH_5(t)$ and $GH_6(t)$ during the step of selecting a color for display. In one embodiment, a red (R), green (G) and blue (B) value for generating an RGB color is determined during the step of selecting a color for display. In one embodiment, an envelope is applied to determine a value for G, $GH_4(t)$ is applied to determine a value for R, and $GH_6(t)$ is applied to determine a value for B. In one embodiment, $GH_2(t)$ and an envelope are applied to determine a value for R, an envelope is applied is applied to determine a value for G, and $GH_8(t)$ and an envelope are applied to determine a value for B. In one embodiment, $GH_2(t)$ and $GH_8(t)$ are each normalized by $\sqrt{E_n}$. In one embodiment, ratios of $H_2/H_8$, and $H_8/H_2$ convolution outputs are used for weights in determining R and B values, respectively. In one embodiment, the statistics of the analysis are reported for a given region of interest within the body 108. For example, in one embodiment, the mean and standard deviation of the output of the three channels shown in FIG. 2, the measures of the first and second order statistics, and their corresponding ratios are reported in addition to the output image. Advantageously, this provides a quantitative summary of the findings in addition to the image.

In one embodiment, a method of forming an image of a region of interest using a pulse-echo imaging device, a pulse is generated using the pulse-echo imaging device. The pulse is generated such that the pulse is incident on the region of interest to generate a reflected echo. A reflected echo is received in the pulse-echo imaging device. The reflected echo is compared to the transmitted pulse, the time derivative of the pulse, and the second derivative of the pulse, and each is associated with a unique label. A label is selected based on the comparison, and an image is generated incorporating the selected label.

In addition to the embodiment described herein, there are optical systems that provide high spatial resolution images, for example Optical Coherence Tomography (OCT), with range dependent signals dependent on optical backscatter and reflections comporable to pulse-echo imaging signals, and where the signals can be analyzed by the methods described herein.

Experimental Examples

Figure 4A:
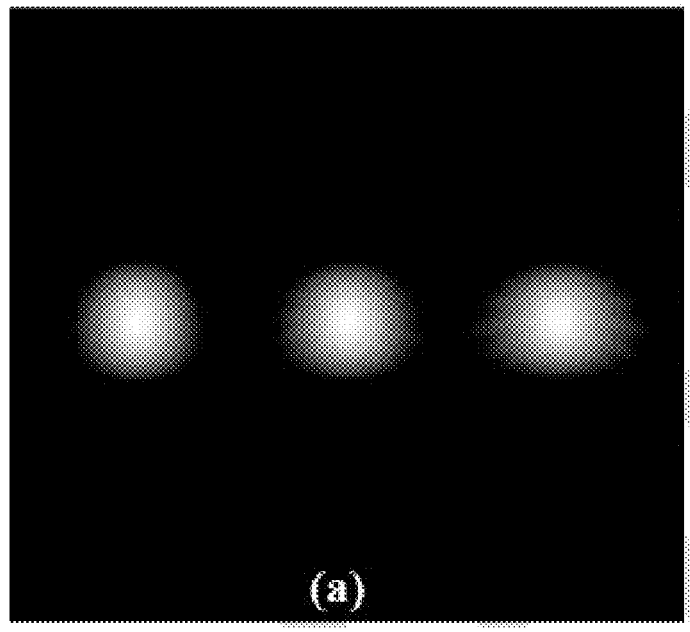
FIGS. 4A and 4B are experimental images of a FIELD II simulation of three scatterers according to one embodiment. A B-scan image with gray scale 50 dB envelope detection is shown in FIG. 4A, while FIG. 4B demonstrates the presence of blue and orange color dimensions.
Figure 4B:
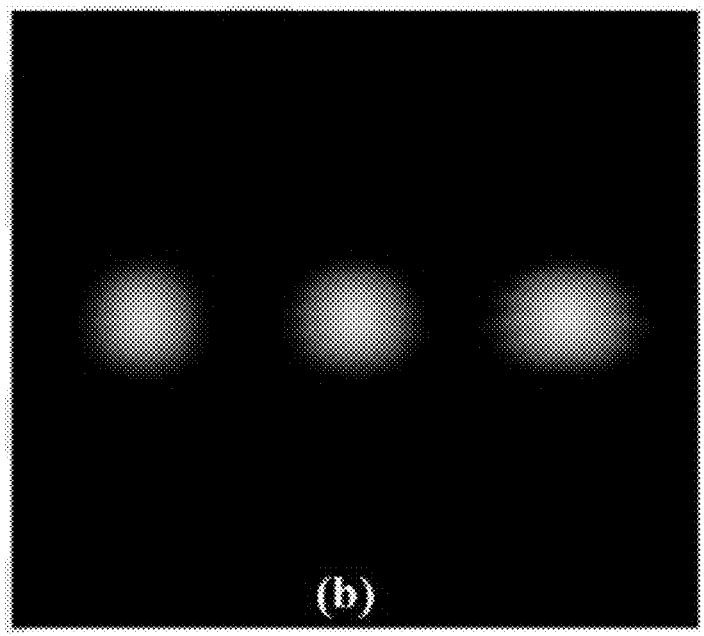
Figure 5A:
FIGS. 5A-5D are experimental B-scan images of a normal human liver at 5 MHz.
Figure 5B:
Figure 5C:
Figure 5D:

To demonstrate the potential of this approach to identify properties that are otherwise hidden in the conventional B-scan, a FIELD II simulation (Jensen, 1996) of three scatterers are shown in FIG. 4. Conventional imaging parameters are used including a 5 MHz center frequency linear array transducer with Gaussian apodization on transmit and receive and a 50 MHz sampling rate. However, a $GH_4(t)$ round trip impulse response was implemented, scaled to a peak frequency of 5 MHz. The three scatterers were located at the transmit focus depth of 65 mm with a 7 mm lateral spacing. Importantly, the right scatterer is a conventional single impulse, the center scatterer a discrete doublet (axially) and the left scatterer a discrete triplet. Thus the scatterers approximately produce reflections that correspond to the pulse, the derivative of the pulse, and the second derivative of the pulse with respect to time. The resulting B-scan image with gray scale 50 db envelope detection is given in FIG. 4A and the three scatterers are similar with small variation in transverse width. In comparison, FIG. 4B (color) demonstrates the "blue" nature of the left scatterer and the "orange" nature of the right scatterer, consistent with their respective properties and frequency weighting according to the derivative operator and eqn (2)-(4). Significantly, the three scatterers are fundamentally different in their respective frequency response. This intrinsic difference cannot be seen on the conventional grey scale B-scan image, FIG. 4A, but the differences can be visualized using this invention as shown by the colors in FIG. 4B.

As a second example, shown in FIGS. 5A-5D, a B-scan of a normal human liver at 5 MHz is analyzed and imaged. Although conventional systems do not attempt to transmit a $H_4(t)$ function, the conventional transmitted pulse has some similarities. So an approximate analysis can be performed using the $H_2$ and $H_8$ correlation functions and then assignment of colors as described above. The first image (4A) shows the conventional appearance of the B-scan using standard 50 dB dynamic range on the echo envelope. The color images (5B-5D) demonstrate different weights applied to the $H_2$ and $H_8$ outputs, assigned to red and blue channels, respectively. These enable a recognition of an added dimension as each region of the echoes are characterized by their low (yellow), medium (white), or high (blue) frequency content as determined by the impedance function present in tissue along the direction of the propagating pulse. Thus, the fine-scale nature of the different reflectors is visualized using the color scheme. The smallest scatterers and ensembles of small scatterers are expected to produce the more blue colors, whereas the largest interfaces are expected to produce the more red/yellow colors, even if these cannot be discriminated within the conventional B-scan envelope image. Note that in this example, a conventional ultrasound scanner was used with a conventional broadband pulse that is approximated by a Hermite polynomial function. Thus, the invention can be implemented on systems that can approximate, but do not necessarily conform exactly to, Hermite polynomial functions. For example, in one embodiment, pulses are similar to Hermite polynomial functions when their normalized cross-correlations in the time domain or spectral magnitudes exceed approximately 0.85.

The disclosures of each and every patent, patent application, and publication cited herein are hereby incorporated herein by reference in their entirety. While devices, systems and methods been disclosed with reference to specific embodiments, it is apparent that other embodiments and variations may be devised by others skilled in the art without departing from the true spirit and scope.

What is claimed is:

1. A method of forming an image of a region of interest using a pulse-echo imaging device, the method comprising:
    generating a pulse using the pulse-echo imaging device;
    causing the pulse to be incident on the region of interest to generate a reflected echo;
    receiving the reflected echo in the pulse-echo imaging device;
    comparing the reflected echo to at least one Hermite polynomial by processing the reflected echo through matched filters, wherein each Hermite polynomial is associated with a color;
    selecting a color for display based on the comparison; and
    generating an image incorporating the selected color.

2. The method of claim 1, wherein the step of selecting a color for display further comprises determining a red, green and blue value for generating an RGB color.

3. The method of claim 1 further comprising:
    generating and reporting at least one statistic about the region of interest based on the comparison.

* * * * *